United States Patent [19]

Scaramucci

[11] Patent Number: 4,781,212

[45] Date of Patent: Nov. 1, 1988

[54] SWING CHECK VALVE WITH REMOVABLE CAGE AND DISC

[76] Inventor: John P. Scaramucci, 10724 Woodridden, Oklahoma City, Okla. 73170

[21] Appl. No.: 88,250

[22] Filed: Aug. 24, 1987

Related U.S. Application Data

[63] Continuation-in-part of Ser. No. 49,383, May 13, 1987.

[51] Int. Cl.⁴ ............................................. F16K 15/03
[52] U.S. Cl. .............................. 137/515.7; 137/527.4; 137/527.8
[58] Field of Search .................. 137/515.7, 527, 527.4, 137/527.8

[56] References Cited

U.S. PATENT DOCUMENTS

| | | |
|---|---|---|
| 922,262 | 5/1909 | Clemens, Jr. . |
| 996,099 | 6/1911 | Leidecker . |
| 2,532,067 | 9/1946 | La Bour . |
| 2,918,934 | 12/1959 | Wheatley . |
| 3,565,107 | 2/1971 | Bunch . |
| 3,817,277 | 6/1974 | Wheatley ................ 137/515.7 |
| 3,933,173 | 1/1976 | Kajita . |
| 3,934,608 | 1/1976 | Guyton . |
| 4,201,241 | 5/1980 | Schertler . |
| 4,223,697 | 9/1980 | Pendleton . |
| 4,230,150 | 10/1980 | Scaramucci . |
| 4,274,436 | 6/1981 | Smith . |
| 4,605,041 | 8/1986 | Teumer . |

*Primary Examiner*—Robert G. Nilson
*Attorney, Agent, or Firm*—Dunlap, Codding & Peterson

[57] ABSTRACT

A swing check valve having the disc supported in a surrounding cage and constructed with a minimum swinging arc. The cage is designed to permit the swinging movement of the disc through approximately 90° and the case is constructed to guide the disc in its final closing "floating" movement. The end portions of the hinge pin for the disc are mounted in recesses facing an abutting valve seat. In all embodiments, the disc and cage may be readily replaced for repair of the valve.

13 Claims, 2 Drawing Sheets

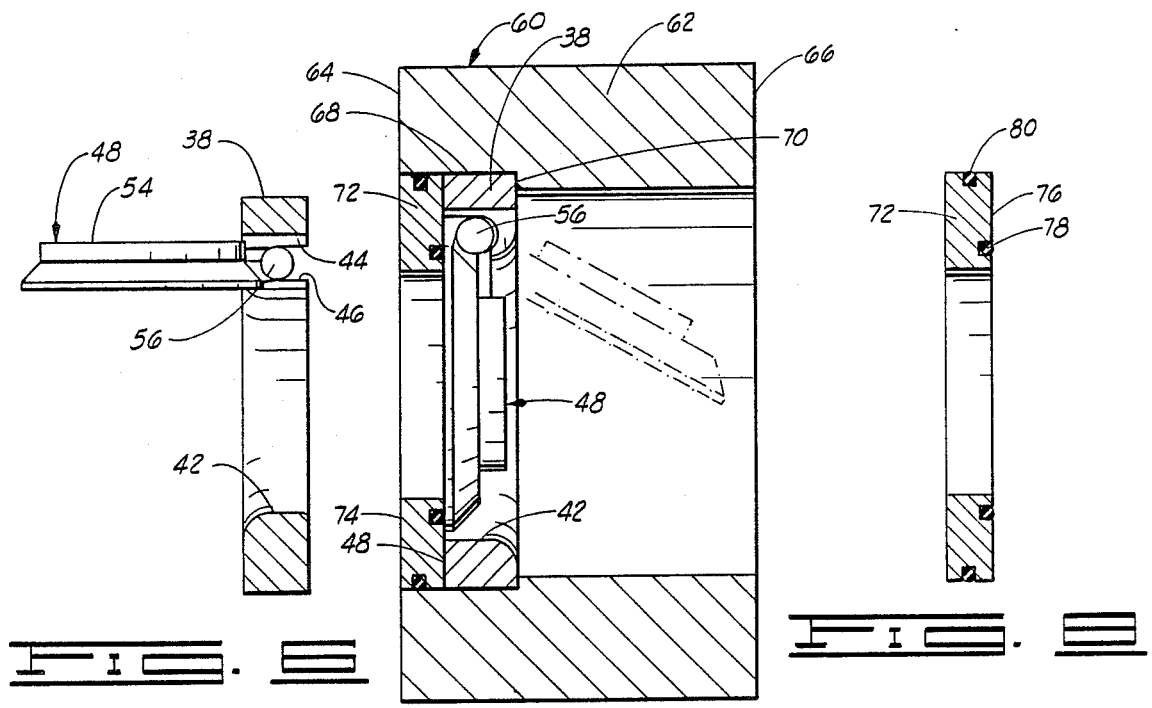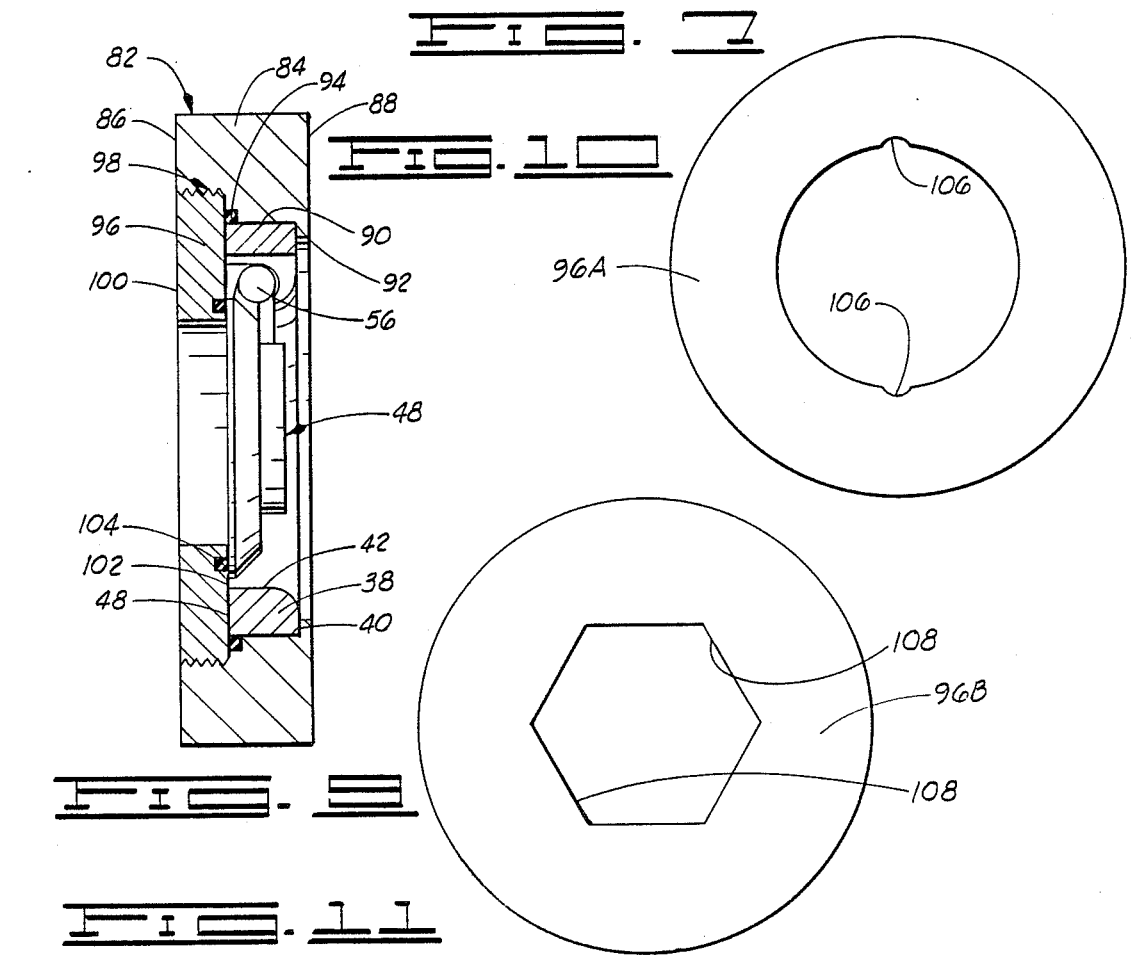

SWING CHECK VALVE WITH REMOVABLE CAGE AND DISC

CROSS-REFERENCE TO RELATED APPLICATIONS

This is a continuation-in-part of co-pending application Ser. No. 49,383, filed May 13, 1987, entitled Swing Check Valve.

BRIEF SUMMARY OF THE INVENTION

1. Field of the Invention.

This invention relates to improvements in swing check valves.

2. Background of the Invention.

It is known to provide a cage for supporting the clapper or disc of a swing check valve where the end portions of the hinge pin of the disc are trapped in recesses in the cage by an abuting valve seat, and where the disc will swing to and from the valve seat through the cage. Heretofore, however, when the hinge pin is located sufficiently close to the seating face of the disc to keep from having to offset the opening through the seat, the structure of the supporting cage has been such to interfere with a full opening of the disc.

BRIEF DESCRIPTION OF THE DRAWINGS

FIG. 6 is an illustration of the position of the disc with respect to the cage of the valve of FIG. 1 when the disc is in a fully open position.

FIG. 7 is a cross sectional view through another form of swing check valve constructed pursuant to this invention.

FIG. 8 is a cross sectional view of the seat ring of the valve of FIG. 7.

FIG. 9 is a cross sectional view through another form of swing check valve constructed pursuant to this invention.

FIG. 10 is an end view of one form of seat ring which may be employed with the valve of FIG. 9.

FIG. 11 is an elevational view of another form of seat ring which may be employed with the valve of FIG. 9.

DETAILED DESCRIPTION OF THE DRAWINGS

Figure 1:
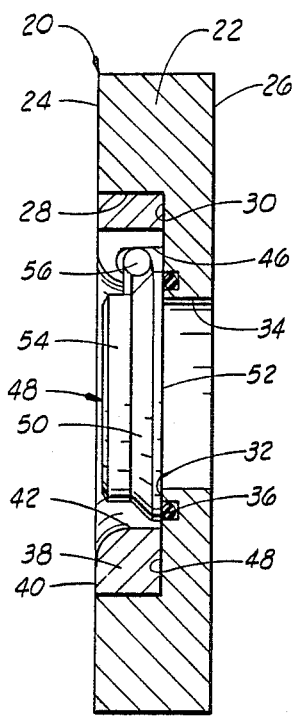
FIG. 1 is a cross sectional view through a wafer-type swing check valve constructed pursuant to this invention.
Figure 2:
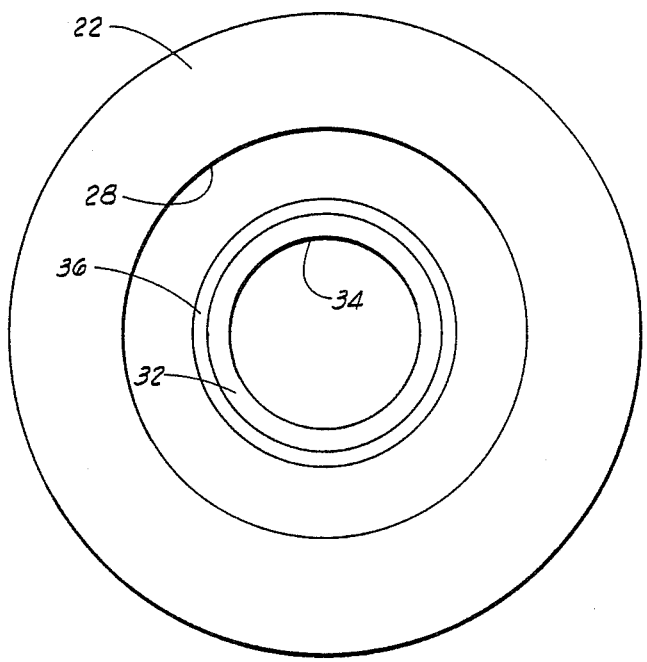
FIG. 2 is an end view of the body of the valve shown in FIG. 1 looking a the left hand side of the valve as illustrated in FIG. 1.

Referring to the drawings in detail, and particularly FIG. 1, reference character 20 generally designates a wafer-type swing check valve having a tubular valve body 22 with planar ends 24 and 26 for the fitting of the valve between pipe flanges (not shown) as is standard for a wafer-type valve. Referring to FIGS. 1 and 2, a counterbore 28 is formed in the end 24 of the body 22 which provides an annular shoulder 30 in the valve body. The inner peripheral portion of the shoulder 30 forms an annular valve seat 32 surrounding the bore 34 through the valve and having a suitable sealing ring 36 mounted in a mating annular groove therein.

Figure 3:
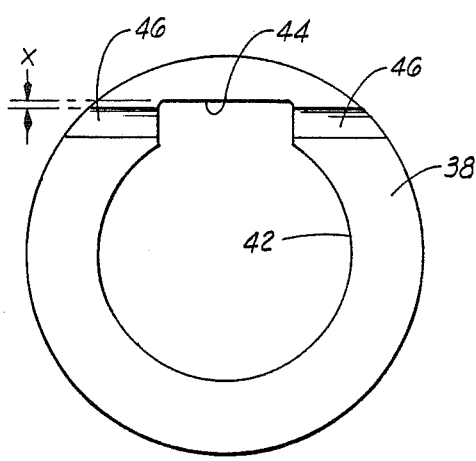
FIG. 3 is an end view of the cage of the valve of FIG. 1 looking at the right hand side of the cage as illustrated in FIG. 1.

The valve 20 also includes a generally ring shaped cage 38 of a size to slidingly fit in the counterbore 28. When the cage 38 abuts the shoulder 30, the outer surface 40 of the cage is coterminous with the end 24 of the body 22. The major portion of the inner periphery 42 of the cage 38 is circular as shown in FIG. 3. However, a section of the cage 38 is removed to provide a generally rectangular opening 44 interrupting and communicating with the circular opening through the disc. A pair of aligned hinge pin recesses 46 are provided in the end face 48 of the cage which abuts the annular shoulder 30. For purposes to be described, the rectangular opening 44 extends radially outward of the hinge pin recesses 46 by a distance as indicated by X in FIG. 3 and in the exploded view, FIG. 4. Also, the inner peripheral surface 42 of the ring 38 from one end of the rectangular opening 44 to the opposite end thereof is rounded from about the mid-point of the thickness of the cage radially outward to the end face 40 of the cage as illustrated most clearly in FIG. 4. The thickness of the cage at each end of the opening 44 between each recess 46 and the inner periphery 42, as well as the end face 40, is indicated in FIG. 4 as being no larger than the distance A.

Figure 5:
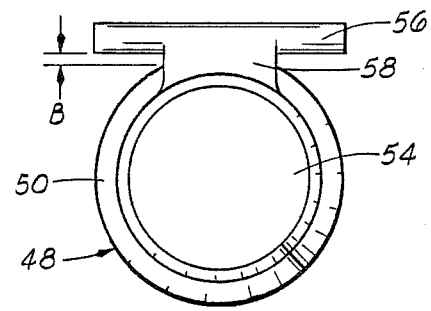
FIG. 5 is an elevational view of the disc of the valve of FIG. 1 looking at the left hand side of the disc as illustrated in FIG. 1.

A clapper or disc generally designated by reference character 48 is positioned in the cage 38. The main body portion 50 of the disc 48 is substantially flat and circular as illustrated in FIGS. 1 and 5. One side of the body 50 is flat to provide a seating face 52 which mates with the seating area 32 when the valve is closed. The opposite side of the body 50 has a circular protrusion 54 which positions the mass of the disc in such a way that the disc 48 will be urged toward a closed position by gravity.

A hinge pin 56 is formed integrally with the main body portion 50 of the disc 48 and extends in a plane parallel with the seating face 52 of the disc. As a portion of the formation of the disc 48, a generally rectangular transition 58 extends from the protrusion 54 to the central portion of the hinge pin 56 to provide structural support for the hinge pin. The width of the transition 50 is slightly less than the width of the opening 44 in the cage 38. As shown in FIG. 5, the distance B between the surface of the hinge pin 56 nearest to the main body portion of the disc and the outer periphery of the disc 48 at each side of the transition 58 is controlled. This distance B is maintained at a minimum to minimize the arc required for the swinging of the disc 48 between open and closed positions. However, as is seen in FIG. 1, the distance B cannot be reduced to the point where the outer periphery of the main body portion 50 of the disc extends radially beyond the centerline of the hinge pin 56; otherwise, the seating face 52 of the disc may drag on the seating face 32 of the seat in the initial opening movement and final closing movement of the disc 48. Another limitation on the distance B is that it must be greater than the distance A shown exaggerated in FIG. 4 in order that the outer periphery of the main body portion 50 of the disc 48 at each side of the transition 58 will not engage the adjacent material of the cage 38 when the disc 48 swings to a fully open position as illustrated in FIG. 6.

Figure 4:
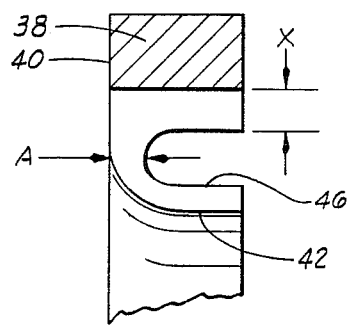
FIG. 4 is an enlarged view of a portion of the cage as illustrated in FIG. 1.

As indicated in FIGS. 1 and 4, the depth of each hinge pin recess 46 is greater than the diameter of the hinge pin 56, such that the disc 48 is free to float a limited distance to and from the valve seat 32. It will readily be seen that the end portions of the hinge pin 56 are trapped in the hinge pin recesses 46 by the shoulder 30. Also, as will be observed in FIG. 6, the extension of the rectangular recess 44 radially outwardly of the hinge pin recesses 46 accomodates a portion of the protrusion 54 of the disc 48 when the disc is in a fully opened position as illustrated.

The rounded portion of the inner periphery 42 of the cage 38 provides adequate clearance for the swinging movement of the disc 48 when the hinge pin 56 is seated in the ends of the hinge pin recess remote from the valve seat 32 to assure no interference with the swinging movement of the disc. On the other hand, the non-rounded portion of the inner periphery 42 of the cage 38 surrounds more than one-half the outer periphery of the disc and functions to guide the disc 48 in its final closing movement. The diametrical clearance between the outer periphery of the disc 48 and the non-rounded portion of the cage inner periphery 42 is between 1/64 inches and 3/32 inches. Such a limited clearance is particularly useful in the event of wear of the hinge pin 56 or the hinge pin recesses 46.

A modified valve is illustrated in FIG. 7 and comprises a tubular body 62 having planar ends 64 and 66 for fitting the valve between flanges in the usual fashion. A counterbore 68 is formed in the end 64 of the body 62 and forms an annular shoulder 70 in the body. The cage 38 is sized to slidingly fit in the counterbore 68 in abuting relationship with the annular shoulder 70. As before, the cage 38 contains and supports the disc 48. A separate valve seat ring 72 fits in the counterbore 78 in abuting relationship with the end 48 of the cage 38. When the seating ring 72 abuts the cage 38, the outer face 74 of the seating ring is coterminous with the end 64 of the body 62.

The seating ring 72 is shown separately in FIG. 8. The inner peripheral portion of what may be called the inner face 76 of the seating ring 72 forms a valve seating area and contains a sealing ring 78 mounted in a corresponding annular groove to sealingly engage the disc 48 when the valve is closed. Another sealing ring 80 is mounted in a mating groove in the outer periphery of the seating ring 72 to sealingly engage the adjacent inner periphery of the body 62 to prevent leakage around the valve seat when the valve is closed.

With the construction of the valve 60, the disc 48 will be guided by the inner periphery 42 of the cage 38 during the final closing "floating" movement of the disc. Also, the disc 48, as before, is free to swing through an arc of approximately 90° into a fully open position.

Another form of valve constructed pursuant to this invention is illustrated in FIG. 9 and designated by reference character 82. The valve 82 has a tubular body 84 with planar ends 86 and 88 for the fitting of the valve between flanges in the usual manner. A first counterbore 90 is provided in the valve body 84 to receive the cage 38 and provide a shoulder 92 for engaging the face 40 of the cage. As shown, the length of the counterbore 90 corresponds with the thickness of the cage 38. Also, a sealing ring 94 is provided in a mating annular groove at the open end of the counterbore 90 to sealingly engage the outer periphery of the cage 38 and prevent leakage when the valve is closed.

A separate seating ring 96 is provided with external threads to engage corresponding internal threads in the valve body 84; such threads being generally designated by reference character 98. The thickness of the seating ring 96 is such that when it is fully threaded into the threads 98, the outer face 100 of the seating ring will be coterminous with the end 86 of the valve body 84. The inner face 102 of the seating ring 96 is flat to abut the end face 48 of the seating ring 38. The inner peripheral portion of the face 102 forms a seating area for the valve and contains a sealing ring 104 to sealingly engage the disc 48 when the valve is closed.

It will be apparent that the disc 48 will be guided in its final closing movements by the non-rounded portion of the inner periphery 42 of the cage 38 and that the disc 48 is free to swing through an arc of substantially 90° to a fully open position without interference.

The valve seat 96 is preferably provided with two or more indentations for the receipt of a suitable tool (not shown) by means of which the seat is threaded into and from the body 84. For example, FIG. 10 illustrates a form of valve seat designated by reference character 96A where the inner periphery of the seat is provided with diametrically opposed depressions 106, such that a tool can be inserted into the seat ring for threading the ring into and out of the body. Also, FIG. 11 illustrates another form of seating ring designated by reference character 96B where the inner periphery of the ring has a series of flat surfaces 108 for the receipt of a suitable tool.

Changes may be made in the combination and arrangement of parts or elements as heretofore set forth in the specification and shown in the drawings without departing from the spirit and scope of the invention as defined in the following claims.

What is claimed is:

1. A valve, comprising:
   a tubular valve body;
   a valve seat in the body having an annular seating face thereon extending transversely with respect to the body;
   a disc supported in the body for swinging movement to and from the seating face of the valve seat, said disc having a substantially flat, circular main body portion and a seating face thereon sized to mate with the seating face of the seat, said disc also having a hinge pin formed thereon extending in a plane parallel with the seating face of the disc; and
   a generally ring-shaped cage in the valve body having one end face thereof abuting the valve seat, said cage surrounding at least one-half of the periphery of the disc, a section of the inner peripheral portion of the cage being removed to provide a generally rectangular opening communicating with the generally circular opening through the cage, said cage having a pair of aligned recesses in said one end face thereof communicating with the opposite ends of said rectangular opening receiving the opposite end portions of the hinge pin, and the inner peripheral surface of the cage extending from one end of said rectangular opening to the opposite end thereof being rounded radially outwardly from about the center thereof to the end face of the cage opposite said one end face;
   wherein the disc further includes a generally rectangular transition between the main body portion of the disc and the central portion of the hinge pin having a width slightly less than the width of said rectangular opening, and wherein the distance between the surface of the hinge pin nearest the main body portion of the disc and the adjacent outer periphery of the disc at each side of said transition is greater than the thickness of the cage at the intersection of each hinge pin recess and said rectangular opening.

2. A valve as defined in claim 1 wherein said rectangular opening extends radially outward of the hinge pin recesses.

3. A valve as defined in claim 1 wherein the depth of each hinge pin recess is greater than the diameter of the hinge pin to allow the disc to float a limited distance to and from the valve seat, and wherein, the inner periphery of the cage is sized to guide the disc when the disc floats.

4. A valve as defined in claim 3 wherein the diametrical clearance between the inner periphery of the cage and the outer periphery of the disc, from one end of said rectangular opening to the opposite end thereof, is between 1/64 inches and 3/32 inches.

5. A valve as defined in claim 1 wherein the valve seat is formed as a part of the valve body.

6. A valve as defined in claim 1 wherein the seat is in the form of an annular ring formed separate from the valve body.

7. A valve as defined in claim 6 characterized further to include a seal ring in the outer periphery of the seat sealingly engaging the adjacent inner periphery of the body.

8. A valve as defined in claim 1 wherein the seat is in the form of an annular ring threaded into the body.

9. A valve as defined in claim 8 characterized further to include a seal ring in the outer periphery of the cage sealingly engaging the adjacent inner periphery of the body.

10. A valve as defined in claim 8 wherein the inner periphery of the seat is shaped non-round to facilitate the threading of the seat into the body.

11. A valve as defined in claim 10 wherein the inner periphery of the seat has a pair of diametrically opposed recesses therein.

12. A valve as defined in claim 10 wherein the inner periphery of the seat has at least one flat surface.

13. A valve as defined in claim 8 wherein the seat has indentations therein to facilitate the threading of the seat into the body.

* * * * *